US011428606B2

(12) United States Patent
Kain Venkatadri et al.

(10) Patent No.: US 11,428,606 B2
(45) Date of Patent: Aug. 30, 2022

(54) SYSTEM FOR THE ASSESSMENT OF AN OBJECT

(71) Applicant: LaserJacket, Inc., Pittsburgh, PA (US)

(72) Inventors: Arun Dravid Kain Venkatadri, Pittsburgh, PA (US); Nirvan Sunderam, Pittsburgh, PA (US)

(73) Assignee: LASERJACKET, INC., Pittsburgh, PA (US)

( * ) Notice: Subject to any disclaimer, the term of this patent is extended or adjusted under 35 U.S.C. 154(b) by 757 days.

(21) Appl. No.: 16/360,886

(22) Filed: Mar. 21, 2019

(65) Prior Publication Data

US 2020/0064230 A1    Feb. 27, 2020

Related U.S. Application Data

(60) Provisional application No. 62/722,129, filed on Aug. 23, 2018.

(51) Int. Cl.
| | |
|---|---|
| *G01M 17/007* | (2006.01) |
| *G06N 20/00* | (2019.01) |
| *G07C 5/00* | (2006.01) |
| *G06N 3/08* | (2006.01) |
| *G07C 5/08* | (2006.01) |
| *G06N 5/00* | (2006.01) |

(52) U.S. Cl.
CPC ............ *G01M 17/007* (2013.01); *G06N 3/08* (2013.01); *G06N 5/003* (2013.01); *G06N 20/00* (2019.01); *G07C 5/008* (2013.01); *G07C 5/0808* (2013.01)

(58) Field of Classification Search
CPC ....... G01M 17/007; G06N 3/08; G06N 5/003; G06N 20/00; G07C 5/008; G07C 5/0808
See application file for complete search history.

(56) References Cited

U.S. PATENT DOCUMENTS

| | | | |
|---|---|---|---|
| 7,734,008 B1 * | 6/2010 | Sanders | G01V 5/0016 378/57 |
| 2010/0207722 A1 | 8/2010 | Rutledge | |
| 2011/0204880 A1 | 8/2011 | Braghiroli | |
| 2013/0039462 A1 * | 2/2013 | Morton | G21K 1/02 378/57 |
| 2013/0332024 A1 | 12/2013 | Garrett et al. | |
| 2016/0221592 A1 | 8/2016 | Puttagunta et al. | |
| 2017/0023698 A1 | 1/2017 | Morton | |
| 2017/0195038 A1 | 7/2017 | Sham | |
| 2020/0066067 A1 * | 2/2020 | Herman | G07C 5/008 |

OTHER PUBLICATIONS

PCT International Search Report and Written Opinion, PCT Application No. PCT/US2019/046961, dated Oct. 29, 2019, 15 pages.

* cited by examiner

*Primary Examiner* — Manuel A Rivera Vargas
(74) *Attorney, Agent, or Firm* — Fenwick & West LLP

(57) ABSTRACT

In various embodiments, an object or vehicle's state, value, diagnostics and/or other condition are obtained from a configurable multi-sensor array. In some cases, the object drives through the sensor array. In some cases, the sensors pass over or by the object. A report is generated on the object's condition. A variety of sensor data are amalgamated into a report via a configurable backend process. A user interface allows for interaction with the ability to interface with components in the system.

19 Claims, 13 Drawing Sheets

SYSTEM FOR THE ASSESSMENT OF AN OBJECT

CROSS-REFERENCE TO RELATED APPLICATION(S)

This application claims priority under 35 U.S.C. § 119(e) to U.S. Provisional Patent Application Ser. No. 62/722,129, "Automated Vehicle Assessment," filed Aug. 23, 2018, which is hereby incorporated by reference in its entirety.

BACKGROUND OF THE INVENTION

1. Technical Field

This invention relates generally to diagnostics. More particularly, it relates to the aggregation and processing of sensor data to ascertain the condition of an object.

2. Description of Related Art

As long as goods have existed, there has been a need to characterize the condition of new and used goods. Jewelers look at objects under loupes or other magnifiers to determine the value of various pieces of jewelry. Comic books have a grading system that, while granular, is still subject to human judgement. Online auctions are filled with goods, in which the goods are described by the user in subjective terms, with photographs that may or may not aid in the description of these items.

Vehicle inspection is an important part of enabling mobility and transportation. As vehicles have evolved and become more technologically advanced, the methods of vehicle inspection have not kept pace and have been more or less the same over time. The traditional walk around with a mechanic with a clipboard is much the same today, as it was when DMVs first administered minimum standards. Minimum standard requirements originated with voluntary inspections in Massachusetts in 1927. Shortly thereafter, Pennsylvania, New Jersey, and Delaware joined the program. More states adopted vehicle inspections on an ad-hoc basis, eventually culminating in 1966 when specific legislation requiring vehicle inspection was incorporated under The National Traffic and Motor Vehicle Act of 1966 and The Highway Safety Act of 1966. Ride hailing companies are bound to do inspection to ensure that vehicles meet local standards and, while self inspections and video inspections are in use today, they still rely on a form of some kind being filled out by a human being, leading to issues with scale and consistency when managing large fleets across multiple locales.

On-board diagnostics (OBD) is an automotive term referring to a vehicle's self-diagnostic and reporting capability. OBD systems give the vehicle owner or repair technician access to the status of the various vehicle subsystems. For mechanics at automotive repair shops, vehicle diagnostics have not had a breakthrough since the use of OBD data in the 1980s, with some incremental improvements having been made with the OBDII standard in the 90's. Cheap and reliable OBDII meters have now made this technology accessible to hobbyists, motoring enthusiasts and the general public. However, OBD based diagnostics have not evolved at the same pace as other aspects of human automotive interfaces such as adaptive cruise control and media center capabilities. In no way have they leveraged advances in artificial intelligence and computer vision, among other things. OBD based diagnostics is limited in what it can cover, as the data must be related to an internal sensor on the vehicle. In no way is it made to interface with a larger fleet management system.

This inadequacy is perhaps most prevalent in the rental car industry where "walk-arounds" prior to renting and returning a vehicle still occur. A rental car company employee walks around the car, often times with the customer present, and fills out a form that outlines the condition of the vehicle in terms of dents and scratches and even mileage and fuel gauge information. This process, while not entirely universal (some may do it on only return for example), is prevalent enough that it adds significant overhead and friction to the rental and return process and thus the industry as a whole. Another use case is in the determination of a used vehicle's or object's value. Currently, loose guidelines are used to attempt to determine a car's "blue book" value, usually referring to an assignment of value based on published guidelines.

However, determining a vehicle's or object's value using purely human judgement introduces both consistency and bias issues. Assessing vehicle condition requires many different measurements, some of which are both qualitative and quantitative in nature. Qualitative assessments are often subject to human error and bias.

Thus there is a need for better systems for assessing a vehicle's or object's condition.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

In various embodiments, an object or vehicle's state, value, diagnostics and/or other condition are obtained from a configurable multi-sensor array. In some cases, the object drives through the sensor array. In some cases, the sensors pass over or by the object. A report is generated on the object's condition. A variety of sensor data are amalgamated into a report via a configurable backend process. A user interface allows for interaction with the ability to interface with components in the system.

Such a system that is automated in nature may reduce manpower costs and create reports that are more objective and faster than today's largely human driven methods. This also allows cases where human inspection is cumbersome and potentially biased, to get fast and unbiased reporting on the state of an object. With the use of machine learning and artificial intelligence, this inherent bias can be removed resulting in more a more objective assessment of a vehicle or object's condition. Assessment of parts of an object that were previously difficult to obtain due to an object's size or position may be mitigated through a flexible sensor array configuration. A flexible and modular sensor array, backend process and user interface may be used to service a wide variety of customer, users and objects.

Some example systems are shown in FIGS. 1-5 and 8-12. These examples are not limiting. Other types of vehicles, objects and sensor arrangements may be used.

Figure 1:
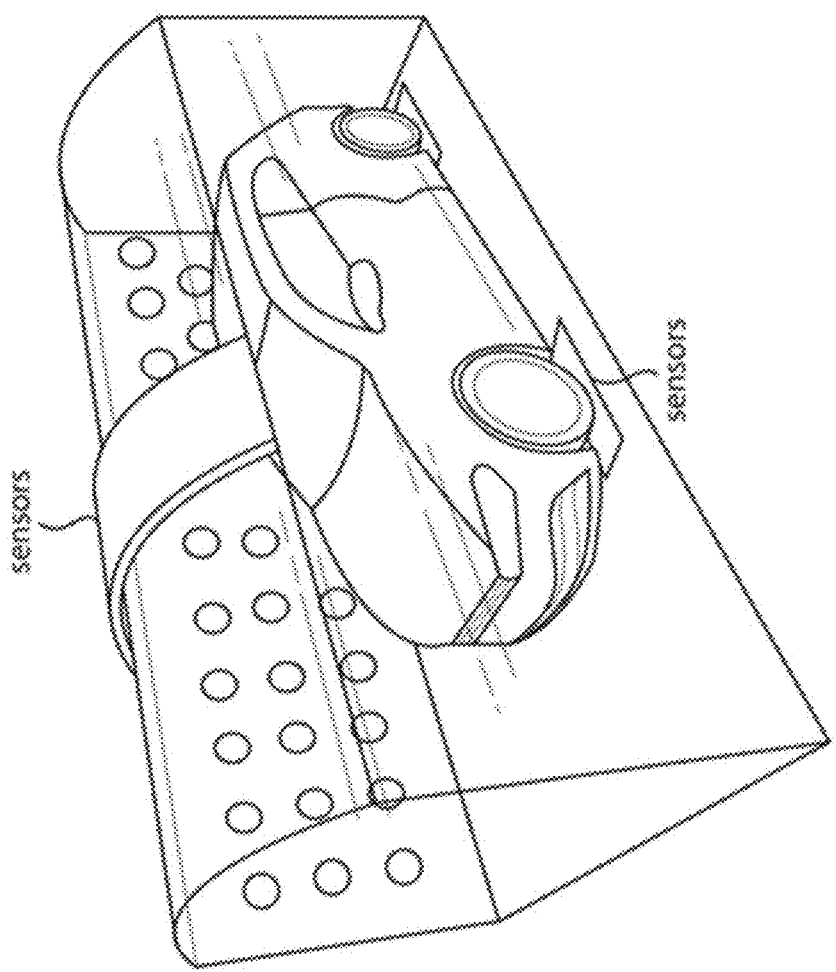
FIG. 1 illustrates a vehicle in motion passing through a sensor array.

FIG. 1 illustrates a vehicle in motion passing through a sensor array. The sensor array may include sensors on either side (including the floor and ceiling) of the archway through which the vehicle passes.

Figure 2:
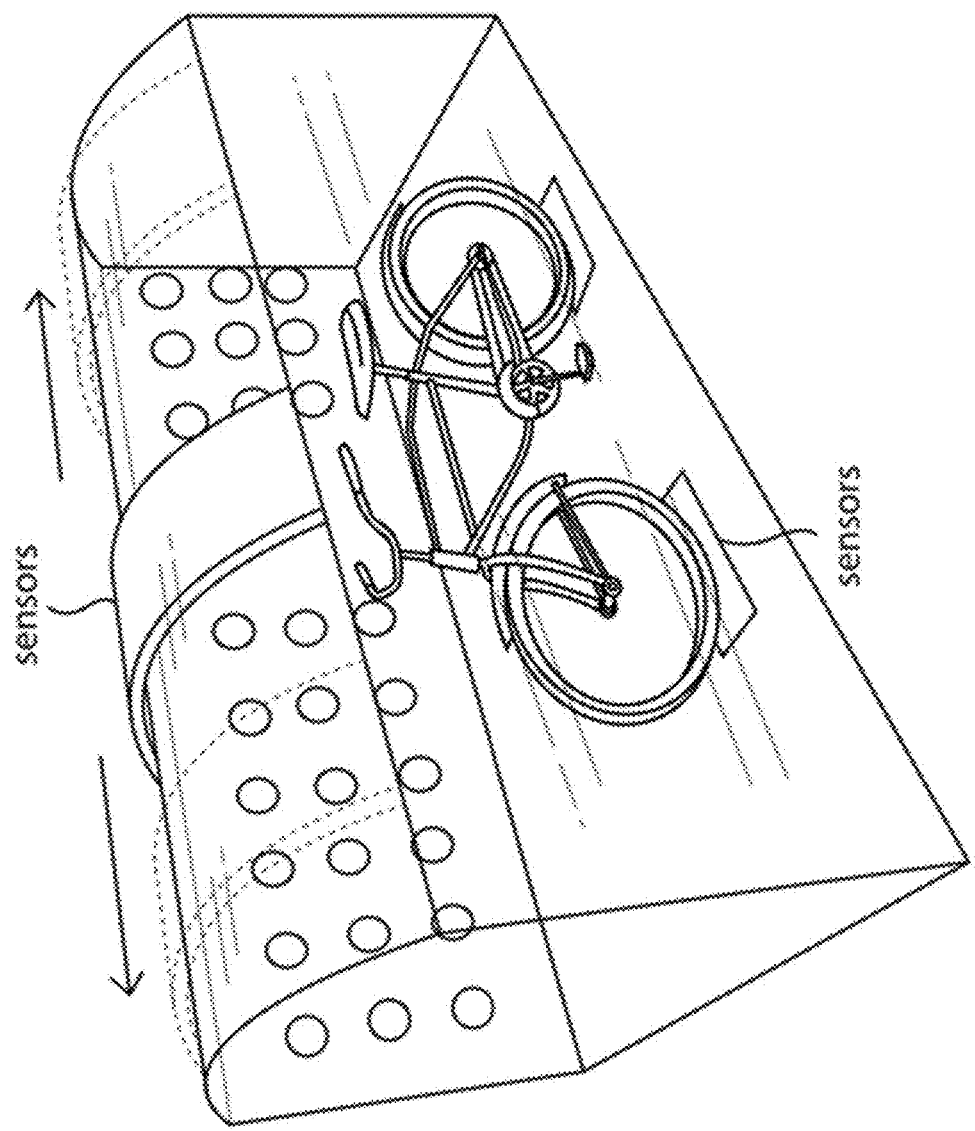
FIG. 2 illustrates that the invention is not limited to four wheeled vehicles.

FIG. 2 illustrates that the invention is not limited to four wheeled vehicles. A bicycle is illustrated here, but the invention is not limited to two or four wheeled vehicles.

Figure 3:
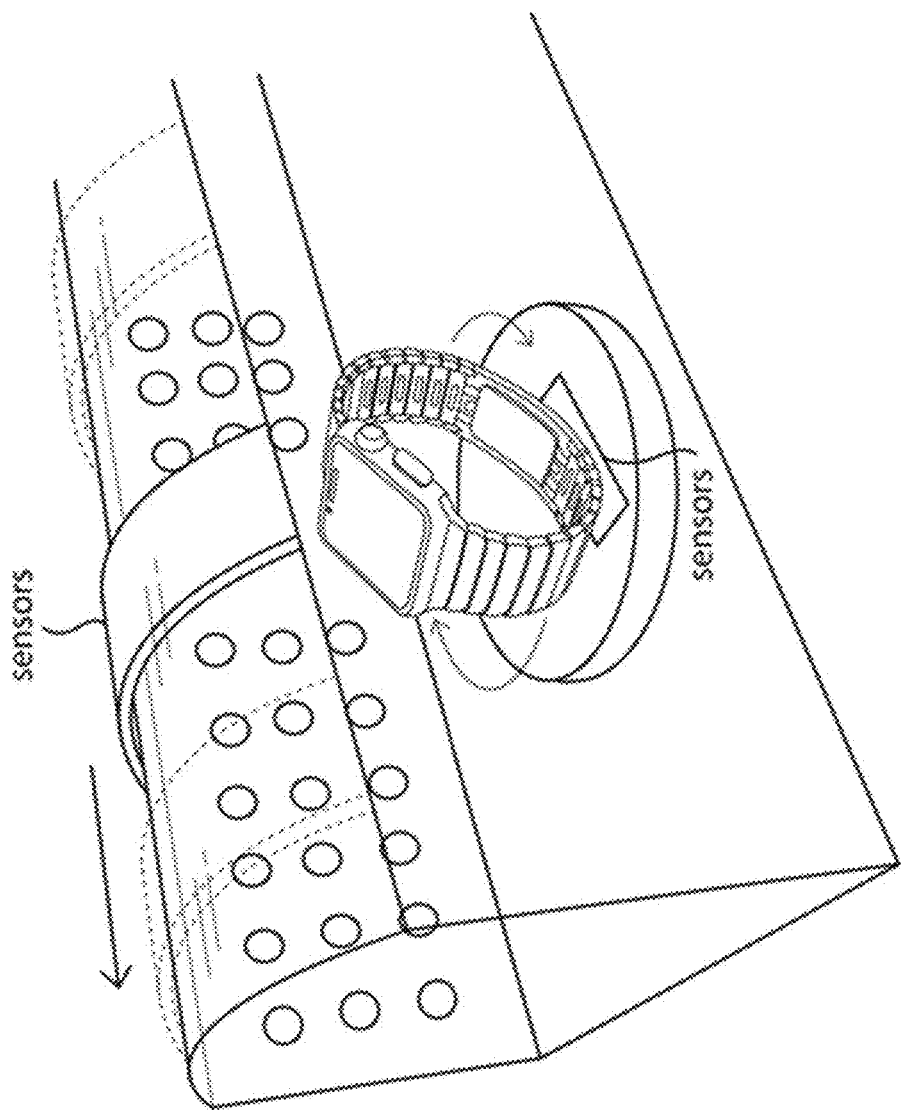
FIG. 3 illustrates a pass over configuration in which the sensor array passes over an object that is stationary.

FIG. 3 illustrates a pass over configuration in which the sensor array passes over an object that is stationary. The object is positioned on a rotating platform to allow the sensor array to collect data on the object from various perspectives.

Figure 4:
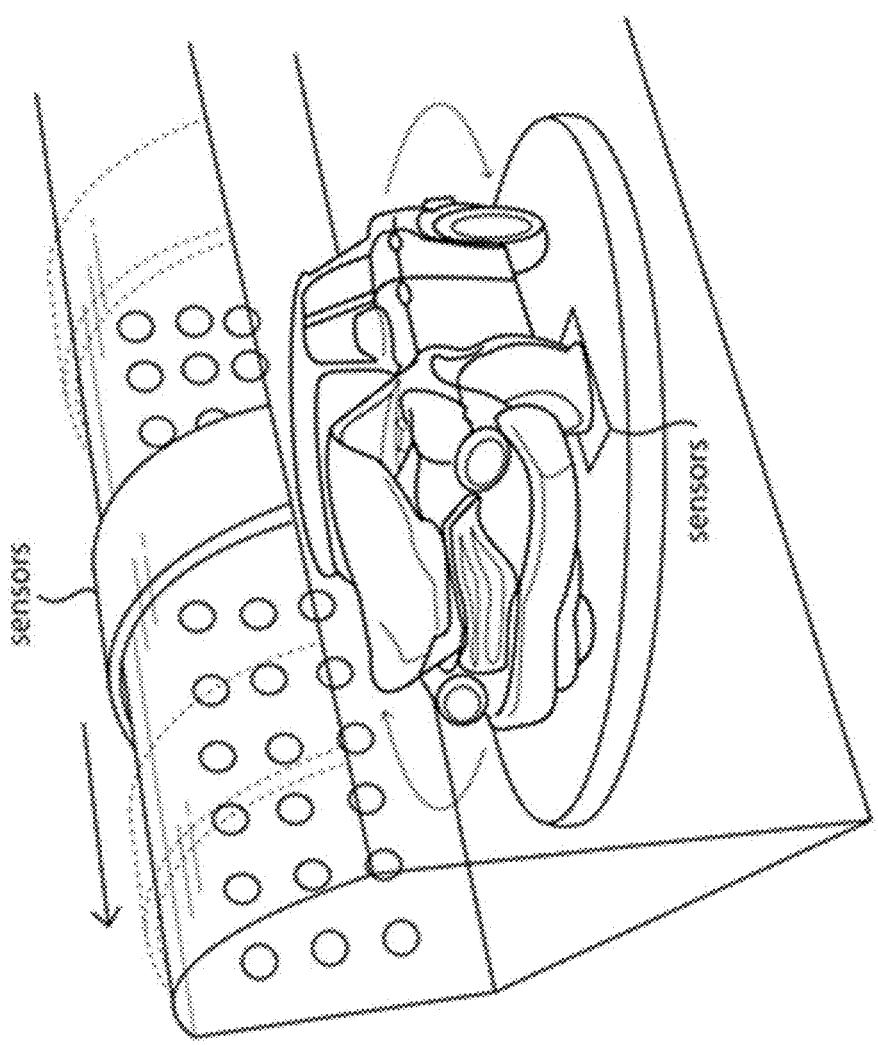
FIG. 4 illustrates the pass over configuration applied to a damaged vehicle.

FIG. 4 illustrates the pass over configuration applied to a damaged vehicle. The vehicle in this case is a damaged car. The vehicle/object is positioned on a rotating platform to allow the sensor array to collect data on the object from various points of view.

Figure 5:
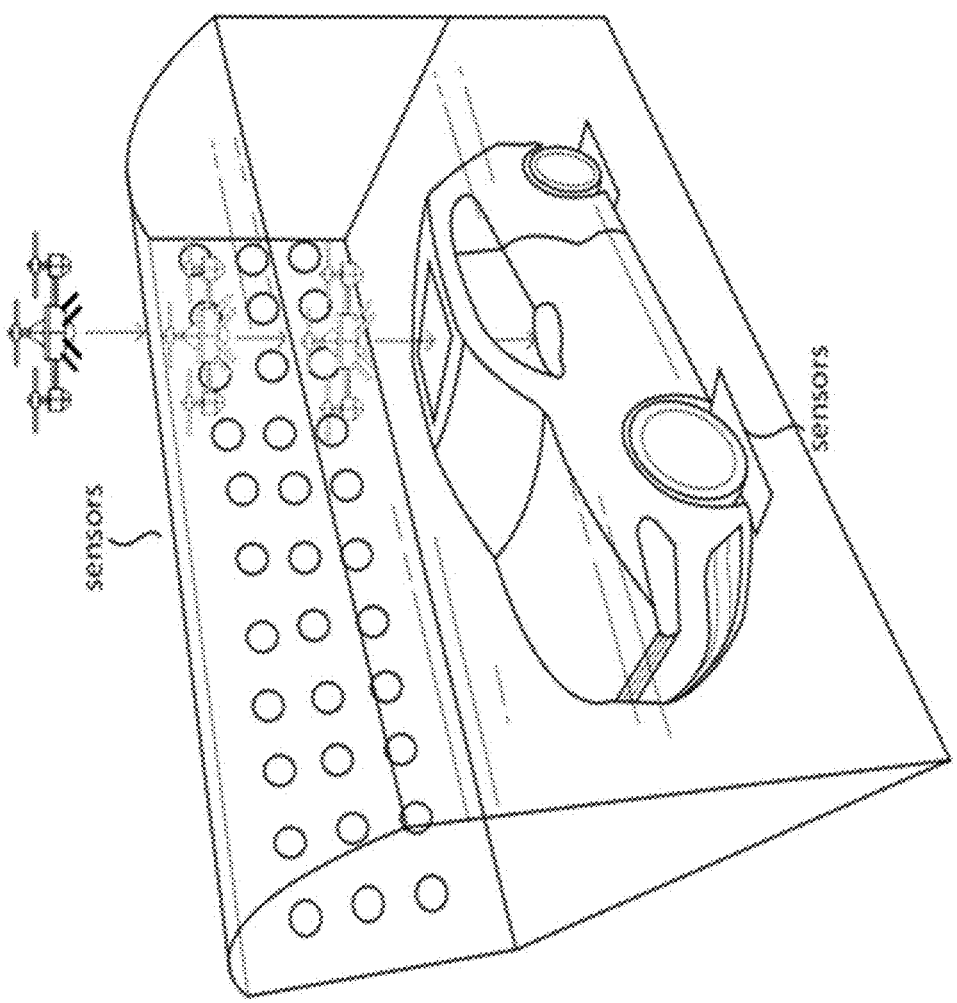
FIG. 5 illustrates a configuration in which the sensor array includes a sensory device that is capable of moving around the vehicle/object in order to gather data.

FIG. 5 illustrates a configuration in which the sensor array includes a sensory device that is capable of moving around the vehicle/object in order to gather data. While in this case for illustrative purposes the drawing depicts a drone, the invention could make use of other sensory devices that are able to move. While this drawing depicts a car, the configuration in which the sensor array consists of a mobile sensor could be applied to other vehicles/objects. Sensors are not limited to the exterior of objects that are large enough, they may travel into the object if needed.

Figure 8:
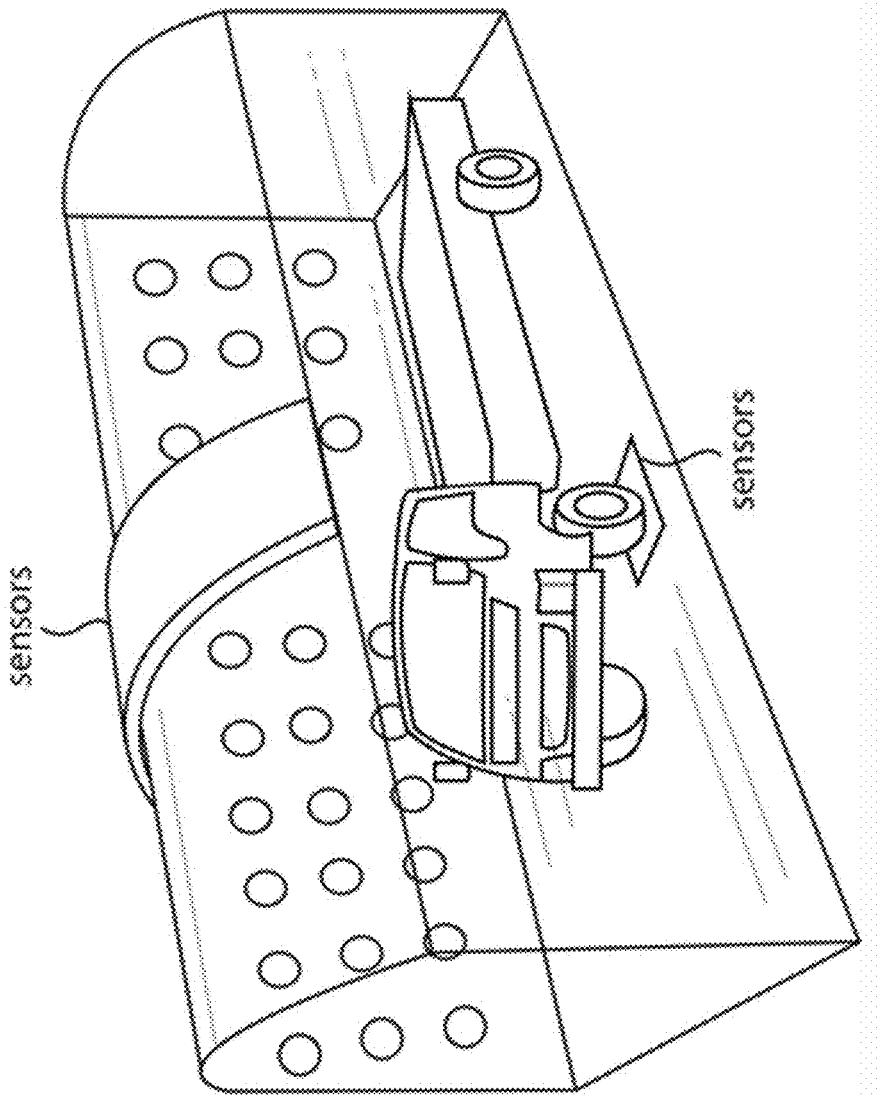
FIG. 8 illustrates a configuration in which a truck passes through the sensor array.

FIG. 8 illustrates a configuration in which a truck passes through the sensor array. The invention could also be applied to vehicles with sleds (for example snowmobiles) or vehicles on a track such as a tank.

Figure 9:
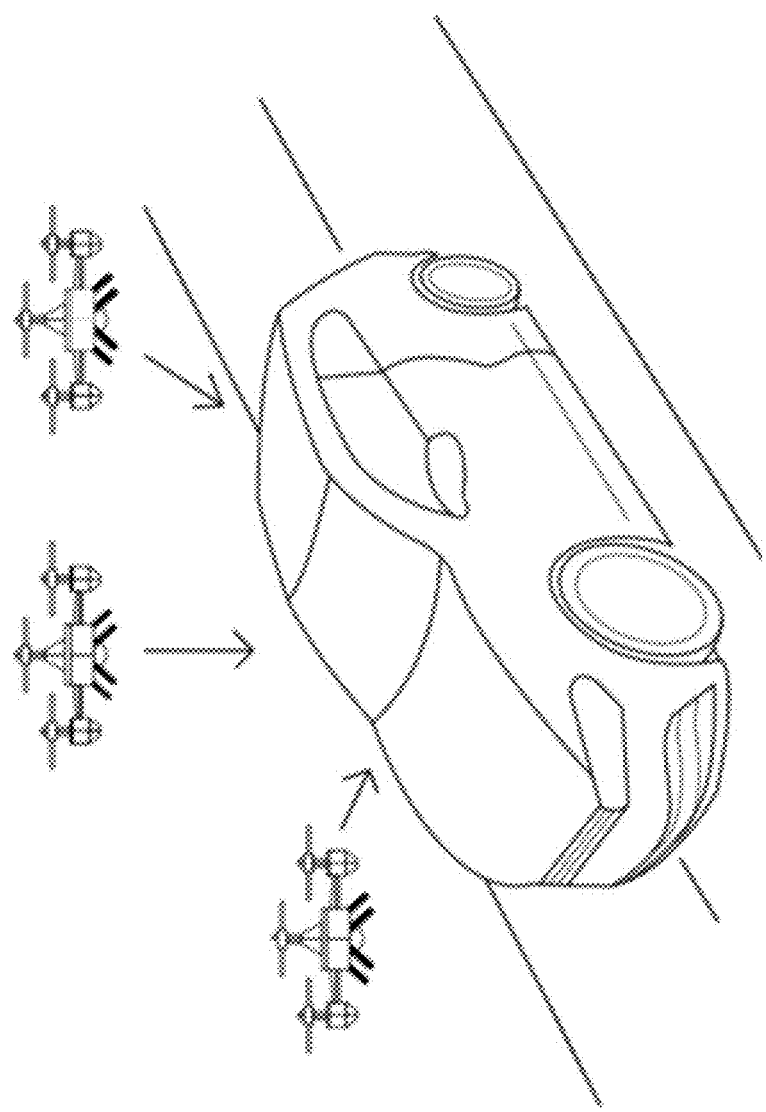
FIG. 9 illustrates a pass over array configuration composed entirely of drones.

FIG. 9 illustrates a pass over array configuration composed entirely of drones. While in this case for illustrative purposes the drawing depicts a drone, the invention could make use of other sensory devices that are able to move. While this drawing depicts a car, the configuration in which the sensor array consists of a mobile sensor could be applied to other vehicles/objects. Sensors are not limited to the exterior of objects that are large enough, they may travel into the object if needed.

Figure 10:
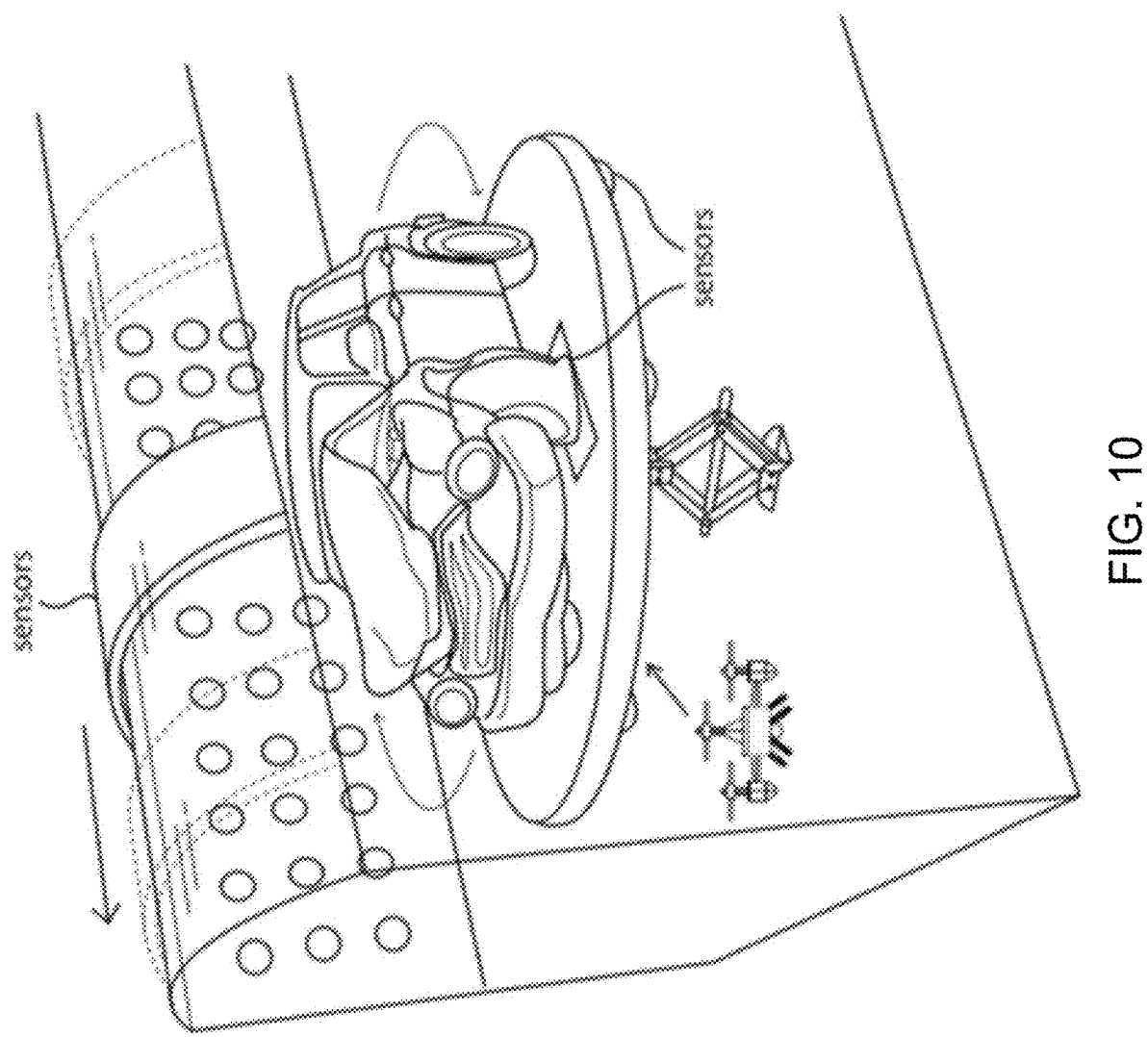
FIG. 10 illustrates a pass over array configuration in which a damaged vehicle is elevated on a platform that can be stationary or rotating.

FIG. 10 illustrates a pass over array configuration in which a damaged vehicle is elevated on a platform that can be stationary or rotating. The mobile sensor (in this case a drone) in combination with the sensor array analyzes the damaged vehicle/object. The combination of the sensor array and the mobile sensor could be bifurcated to be used separately or in conjunction with each other.

Figure 11:
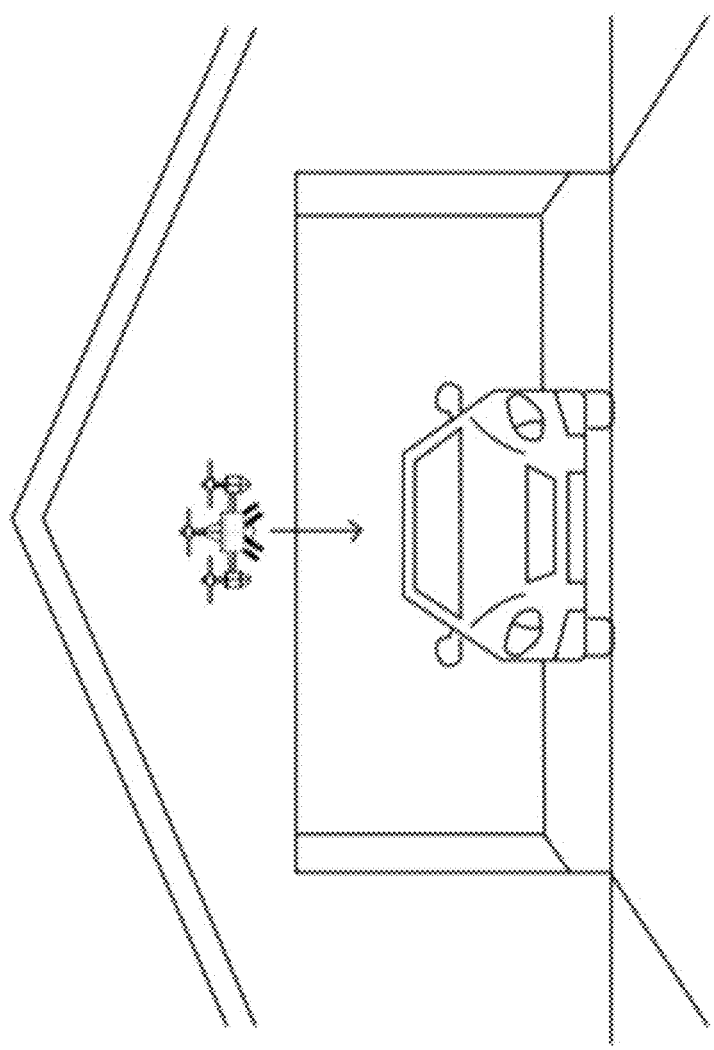
FIG. 11 illustrates a pass over array configuration composed entirely of drones.

FIG. 11 illustrates a pass over array configuration composed entirely of drones. The depiction here is application of the mobile sensor in a residential setting as opposed to an industrial one.

Figure 12:
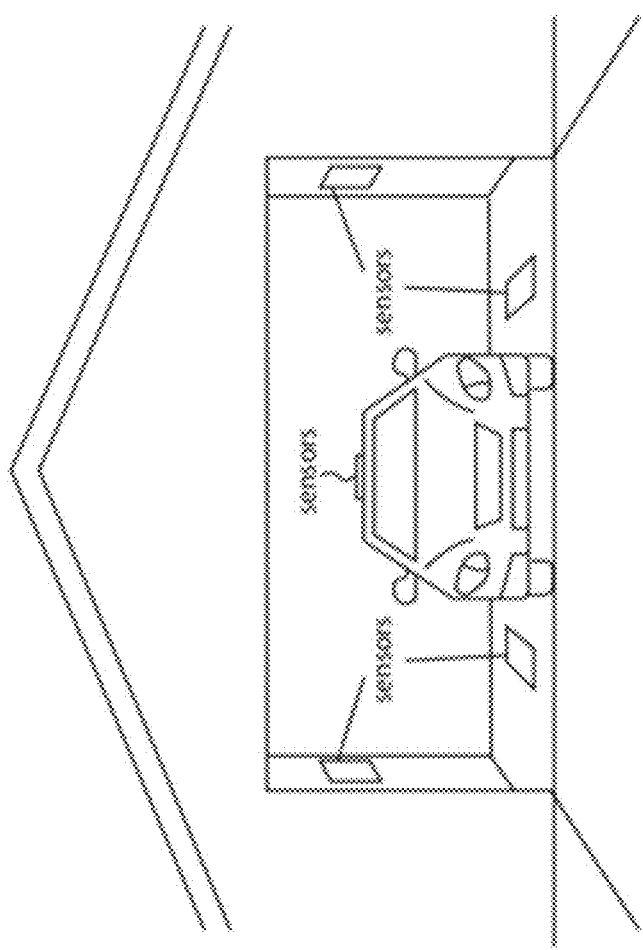
FIG. 12 illustrates an archway configuration in a retail setting where a garage is retrofitted with the sensor array to allow for home based vehicle condition reporting.

FIG. 12 illustrates an archway configuration in a retail setting where a garage is retrofitted with the sensor array to allow for home based vehicle condition reporting.

Various systems in accordance with the invention include three main components: 1) Configurable Sensor Array, 2) Modular and Parallelizable Backend Data Storage and Computation, and 3) Configurable User Interface. The Configurable Sensor Array preferably is modular and configurable in both type(s) of sensors and physical configuration based on the use case and customer needs. The form factor preferably has a great degree of variance, and configurability in order to allow for multiple object types to be scanned. A Modular and Parallelizable Backend Data Storage and Computation component is used to process data using a variety of techniques that may utilize standard processing and artificial intelligence to process sensor and other data to arrive at the assessment of an object. A Configurable User Interface that is configurable to the needs of the user is used to allow customers/users to interact with potentially any aspect of the system to serve their use cases or surface only information that is needed to them. For example, customers/users may use this interface to view output, monitor the system, program/configure the system and for the viewing of business related information.

In some embodiments, the sensor array may be in a fixed hardware configuration, where the hardware sensor suite cannot be easily changed after manufacture but software changes or upgrades can be made. In other embodiments, the sensor array may be in a fixed hardware and software configuration, where the sensor suite cannot be changed after manufacture in regards to both hardware and software.

Figure 6:
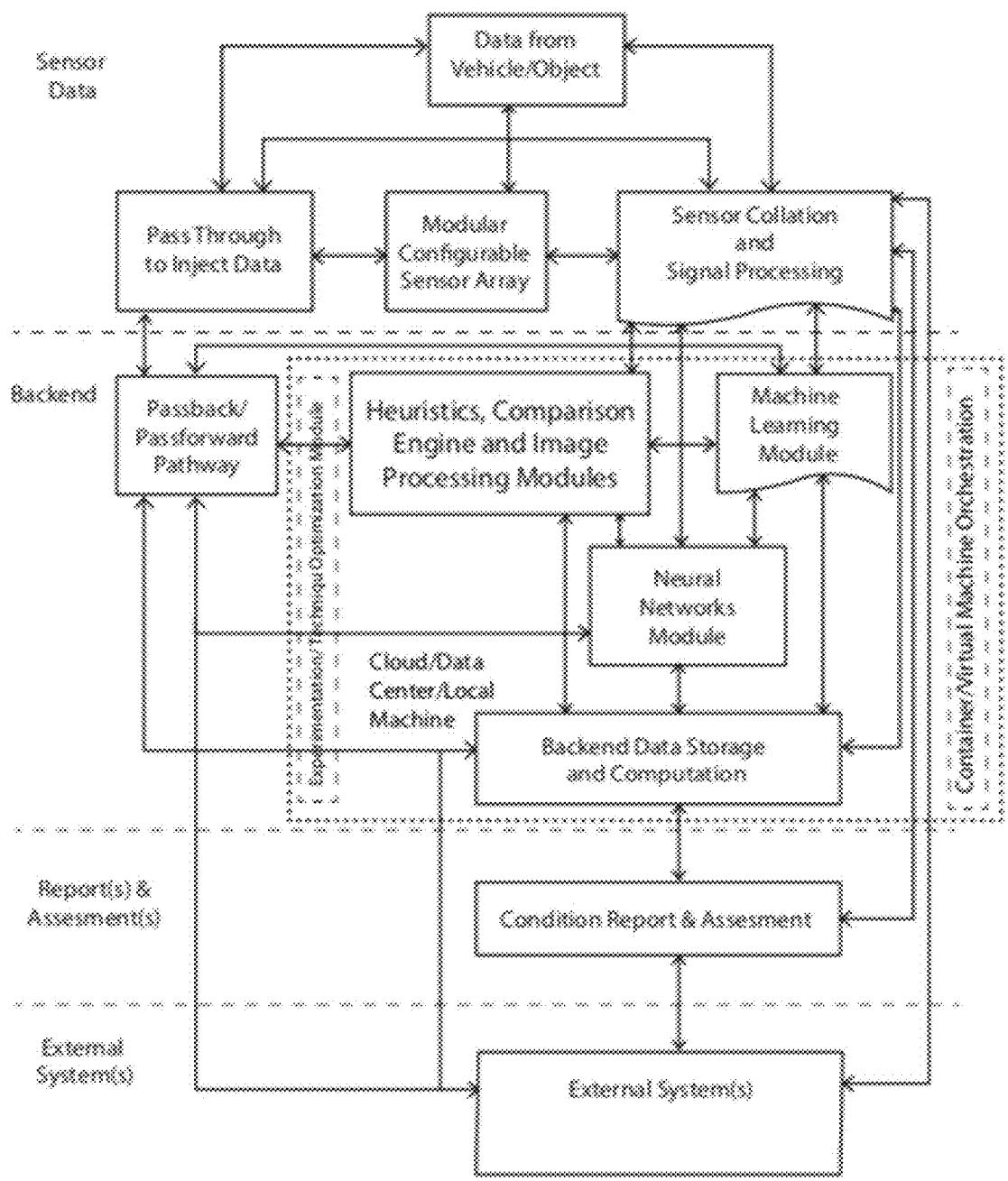
FIG. 6 illustrates an example of a backend data storage and computation module and the flow of sensory data in order to generate a condition report.
Figure 7:
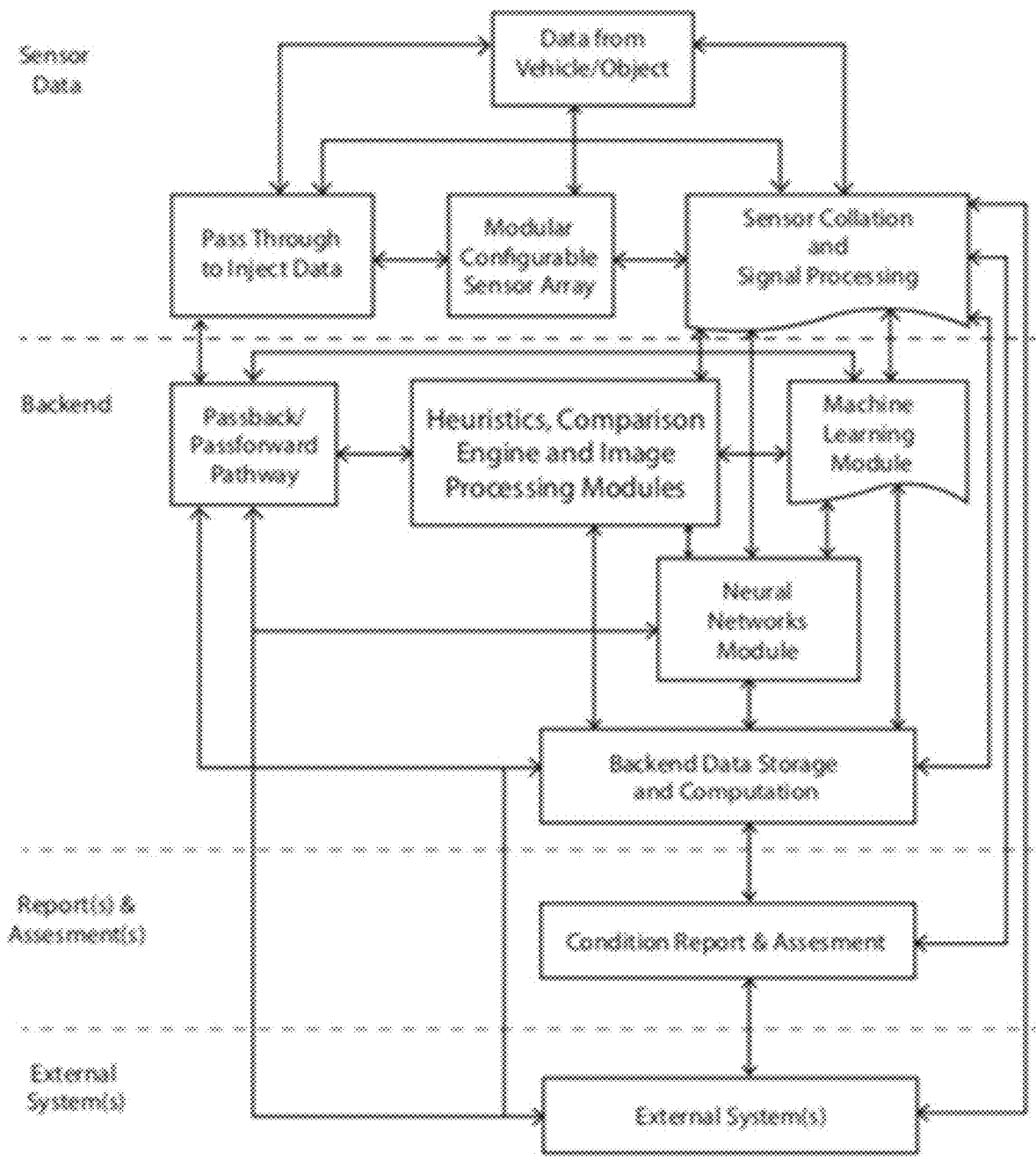
FIG. 7 illustrates an alternative example architecture and the flow of sensory data in order to generate a condition report.

The three main components interact with each other in the way depicted in FIG. 6 and FIG. 7. FIG. 6 illustrates an example of a backend data storage and computation module and the flow of sensory data in order to generate a condition report and possibly pass this data to and from an external system. The architecture is flexible, modular and allows for both homogenous and heterogenous parallelization.

FIG. 7 illustrates an alternative example architecture and the flow of sensory data in order to generate a condition report and possibly pass this data to and from an environment in a situation where processing components do not exist on a single machine, data center or cloud provider. The architecture is flexible, modular and allows for both homogenous and heterogenous parallelization.

Consider the different components in more detail.

Configurable Sensor Array

A configurable array of single/multiple sensors and sensor type(s) is used to gather data that is then sent to a sensor collation and signal processing module where extra processing is done if needed, and then to a Backend Data Storage and Computation Component. Data can be passed back and forth to an object that is capable of receiving and/or sending information for the purposes of passing relevant data to and from the system. For example, this data may result in the sensors being positioned differently to align with the object, the object repositioning itself or altering its trajectory through the archway, passing of self-reported data from the object to the system. Data can also be passed to the object to perform self-maintenance (Examples: as a vehicle dumping oil automatically, an object updating its firmware, or a watch setting its time) or asking the object to perform fault propagation activities like those described herein. Data can be injected into the sensor array or into the Sensor collation and signal processing module for the purposes of diagnostics, verification of data, simulation or receiving data from an external system for analysis, verification or further processing. The sensor array can vary in dimensions to suit the application needed.

This module may also contain application specific integrated circuits (ASICs) or other specialized hardware that processes data with or without further computation by the system.

In addition to the types of sensors, the form factor of the sensor array can come in multiple forms:

- A Pass-through' configuration in which an object or vehicle moves through and is scanned as illustrated in FIG. 1. The Pass-through configuration can be applied to various types of vehicles as illustrated in FIG. 8.
- A "Passover/Under" configuration in which an object or vehicle is stationary and the sensors pass over and/or under an object and is scanned
  - The object may have conveyors, or rotate on a platform to attain sensor data from any/all angles as illustrated in FIG. 3 and FIG. 4
  - The array may include drones, which scan the object or have sensors that are mobile yet are attached to some degree as illustrated in FIG. 9.
- A "Full motion" configuration in which both the sensor array and vehicle are moving and is scanned as illustrated in FIG. 2.
- A Hybrid configuration, where any of the three configurations mentioned above exist simultaneously and to varying degree. A hybrid configuration example is illustrated in FIG. 5 where a vehicle passes through the sensor array, but is also complemented with a mobile sensor which also is used to collect information used to assess the condition of the vehicle. FIG. 10 is an alternative hybrid configuration using a combination of a Passover/Under configuration with an elevated rotating platform, and a mobile sensor.
- A Partial configuration, where any of the states mentioned exist as only a portion (for instance just a sensor array below the car, but nothing else).
- The form factor of the sensor array may be on a standalone basis as illustrated in FIG. 1 or integrated into a residential setting where the sensor array is retrofitted into a garage as depicted in FIG. 12. FIG. 11 illustrates the use of a mobile sensor in a residential setting.

Sensor Data Acquisition

For general objects, the following serves as an example of the type of data the system may ascertain:
  Surface scratches, corrosion or defects
  Formation or cut of a gemstone
  Staining, patina, coloring or other visible signs of aging
  Coloring or tint of precious stones
  Verification of serial numbers
  Relative condition to similar objects of the same age/model
  Brand and type of object
  Model of object
  State of calibration of the object
  Composition of materials in an object.
  Size of seams and gaps in an object
  Foreign bodies attached to or embedded in an object
  Luster, sheen, transmissivity, conductivity, reflection of an object
  Comparison of an object against an 'ideal' object of the same type
  Comparison of an object against various objects of the same type of varying condition
  Signs of wear
  Weight of an object
  A 3-D spatial map of the object
  Creation of a single or multiple composite images of an object from camera data
  Fraying
  Signs of use and wear
  Software and hardware version of an object
  Identification of key points of interest on an object The following items are examples of the types of data the system may collect with regards to a vehicle through sensors:
Identification of the Vehicle/General Vehicle Data/Data Generated by the vehicle:
  Registration plates
  Vehicle Identification Number
  Data passed from the vehicle to the invention regarding its identity
  Data passed from attachments within the vehicle such as toll RFID
  Generating a 3-D spatial map of the vehicle from the sensor data
  Mileage of the vehicle
  Mileage since the last scan
  Cleanliness of the outside or inside of vehicle
  Condition of the interior
  On Board Diagnostics data
  Internal camera or audio data from the vehicle Brakes
  Brakes condition and operation
  Emergency/Service/Parking/Secondary Brake performance and efficiency
  Additional braking device condition
  Brake pad and rotor condition and operation
  Anti-lock Braking system condition and operation (ABS)
  Electronic Braking system condition and operation (EBS)
  Regenerative Braking system condition and operation
Steering
  Steering Mechanical Condition and Operation
    Steering Gear Condition and Operation
    Steering Gear Security Feature Condition and Operation
    Steering Linkage Condition and Operation
    Power Steering Condition and Operation
  Steering Wheel and Column
    Steering wheel and handlebar Condition and Operation
    Steering wheel column Condition and Operation
    Electronic Power Steering (EPS) Condition and Operation
Visibility
  Field of Vision
  Condition of glass
  View to rear
  Side view mirrors
  Sight line check
  Windscreen wipers
  Windscreen washers Lamps, Reflectors and Electrical Equipment
   Headlamps condition and operation
   Front and Rear position lamps condition and operation
   Brake Lights condition and operation
   Direction indicators condition and operation
   Hazard warnings condition and operation
   Front and Rear fog lamps condition and operation
   Reversing Lamps condition and operation
Axles, Wheels, Tires and Suspension
   Classification as to the condition and operation of the axle of the vehicle
   The system may integrate wheel play detectors in order to accurately assess the condition and operation of a vehicle's suspension and steering
   Computer vision may be used to identify a wheel with a missing nut, bolt, or stud.
The Sensor array can collect data related to tire condition and provide data such as:
   Malfunctioning or under-inflated over over-inflated tire
   Load capacity not in accordance with minimum requirements
   Load capacity insufficient for axle presented weight
   Detect whether tires on same axle or on twin wheels are of different sizes
   Tires on same axle of different structure
   Detect cuts and lesions in tire treads and make assessments on potential impact and classify as acceptable, or dangerous.
   Determine the depth and condition and operation of treads on tires.
   Presence of foreign bodies in the wheel well/wheel assembly
Suspension—A condition report may include an inspection of both springs and shock absorbers as part of an overall condition report of the suspension system.
Calibration and Status of Autonomous Vehicle Hardware and Driver Assist Features
   Currently the hardware for an autonomous vehicle is measured manually for recalibration. This process can be labor intensive and cumbersome. In a more ideal situation, the combination of an autonomous system such as described herein can aid in the reporting on the calibration status of autonomous hardware and software. For example
   Lidar
   Radar
   Cameras
   Inertial Measurement Unit
   Localization
   Testing of ability of autonomy of assisted drive or autonomous system to follow a path or trajectory
   Receiving and processing of anomalous or interesting events that the vehicle encountered or self diagnosed/reported.
   Injection and recording responses from data/tests
   Map testing/updating
   Reporting of software and hardware versions As more technologically advanced vehicles become more commonplace, this technology can be applied to cars that are not autonomous as well. Furthermore the system can prescribe a series of actions to help fault propagation to aid in their detection. An operator, or a vehicle/object capable of performing these actions, automatically may perform these actions.

Object Diagnostic Actions for the purposes of aiding fault propagation and detection.

In order to aid the diagnostics process it is possible that we would prescribe a series of actions either manually executed by a person or person(s), or automatically performed by the vehicle in order to help with fault detection. These actions can be communicated to an object that is capable of receiving such data or to an operator/consumer via audio communication or via smart device. Examples of this include but are not limited to:

1.) Operating the hands of a wristwatch in order to evaluate the entire dial of a watch
2.) Testing the screen of a smartphone/monitor/television by prescribing a series of images or pixel patterns to be shown
3.) Asking a consumer/operator to move the object to a different evaluation position
4.) In the case of audio equipment sound tests to ensure audio function/fidelity or quality
5.) Turning an object on and off
6.) Operating connectivity abilities (wifi, 5g)
7.) Operation of mechanical relays, or components Vehicle Diagnostic Actions for the purposes of aiding fault propagation and detection.

In order to aid the diagnostics process it is possible that we would prescribe a series of maneuvers either manually executed by a driver, or automatically performed by the vehicle in order to help with fault detection. These actions can be communicated to a vehicle that is capable of receiving such data or to an operator/consumer via audio communication or via smart device. Diagnostic activities that a vehicle may perform in this case include:

1.) Braking
2.) Shifting into neutral and accelerating
3.) Shifting into park and accelerating
4.) Shifting through various gears and accelerating
5.) Accelerating
6.) Turning the steering wheel
7.) Shifting into various gears and accelerating
8.) Reversing
9.) Reversing and accelerating.
10.) Flipping the right turn indicator light
11.) Flipping the left turn indicator light
12.) Turning headlamps on and off
13.) Flashing high beams
14.) Turning fog lights on and off.
15.) Opening and closing doors
16.) Locking doors
17.) Unlocking doors
18.) Rolling windows down and up.
19.) Turning windshield wipers on and off.
20.) Opening and closing sunroof
21.) Popping trunk
22.) Closing trunk
23.) Opening and closing fuel port
24.) Opening and closing data offload port.
25.) In the case of a vehicle that is connected and capable of transmitting data, transmitting vehicle state and any data of interest.
26.) Sound test of horn.
27.) Test of Lidar detection of an object
28.) Resolution of an object using the vehicles camera
29.) Detection of objects using the vehicles radar
30.) Testing of a vehicles localization and map
31.) Testing of the vehicles Inertial Measurement Unit(s)/Accelerometers through various maneuvers
32.) Operating connectivity abilities (wifi, 5g,4G,LTE, bluetooth,WiMax etc)
33.) Operation of mechanical relays, or components The purpose of these maneuvers is to allow a sensor array to gather relevant data, such as the luminescence level (or lack of function) of lights, or to allow sounds like brake squeaking or engine knocking to be picked up by a sensor. Visual cues, like the windows being moved up or down, and doors being able to be opened are also important for any onboard system to record and possibly transmit to the backend process and for computer vision to detect and potentially reconcile.

Sensor Collation and Signal Processing

Sensor data is sent to a module that correlates sensor data. This module is configured for the sensors for a given use case, or customer, by an input configuration that specifies what sensors are present, and what types of processing is needed.

The sensor data is then processed. For example a pressure sensor may send a voltage. However it must be interpreted to provide a value. The sensor data is then collected and is sent through a pipeline that is configured to include some or all of the modules described above. It is possible preprocessed data may be sent to this module, but in cases where it cannot happen prior, it happens here. Weighting of inputs can be done here or in the backend data storage and computation layer. Data may pass unprocessed from this module in its raw form when needed.

This module may also contain application specific integrated circuits (ASICs) or other hardware that processes data with or without further computation by the system. This module is optional and may be implemented in software and/or hardware.

Backend Data Storage and Computation

These modules may be defined in the cloud.

Modules listed in this section may be optional and may be implemented in software and/or hardware Modules listed below may run locally or in a cloud/data center Data from these modules may be passed to or from any other modules as needed.

Experimentation or informing of experimentation of different techniques may take place in modules in this section Data generated by or stored by these modules may be made searchable by various techniques such as indexing, tagging, labeling etc.

For different configurations, it is possible to use the methods described below or standard features provided by cloud computing platforms to achieve the same results.

While the modules here have been broken out for illustrative purposes, it is possible for them to all exist within a data storage and computation module provided by a cloud computing provider, or a local machine(s)/specialized hardware, in whole, in part, or any combination thereof.

Other modules may be added to support other types of computation, to keep up with the state of the art, or implement findings from research.

Example configurations of the Backend/Computation Modules and flow/computation of sensory data are illustrated in FIGS. 6 and 7.

Container Orchestration/Virtual Machine Orchestration/Workload Distribution

The flexible backend allows to break up processing tasks into containerized units/virtual machines/processing units and have them orchestrated in order to produce desired results. Each container/virtual machine/processing unit may contain some or all the Heuristics, Experimentation/Technique Optimization Module (ETOM), Image Processing and Initial Comparison Engine, Machine Learning, Neural Networks and Data Storage and Computation modules. This allows for parallelization of large tasks. This may or may not be handled by a cloud platform automatically. This module allows for a wide variety of Backend processing and/or storage and computation modules that are capable of homogenous or heterogenous parallelization. Homogenous in this sense means that the parallel Virtual Machines/containers/processing elements are identical. Heterogeneous means that they differ in configuration, and can use different permutations of the components and subcomponents. Standard methods for allocation of GPU and CPU to tasks can be performed here or in the any of the following modules. The results of parallelized work can be done in this module, with a specialized module for aggregation, the Experimentation/Technique Optimization module or in the data storage and computation module.

Experimentation/Technique Optimization Module (ETOM)

In the course of developing and training models, it is useful to be able to experiment with different techniques across the processing modules outlined below. This is a module that can be connected to modules in the backend data storage and computation, the configurable and modular sensor array component and the user interface components. This module may perform but is not limited to the following actions:

1.) Searching for the best technique to use given a sensor data set
2.) Handling human guided or auto-experimentation of methods
3.) Keeping track of experimentation data and results in order to inform the best techniques.
4.) Suggestion or automatically using the best 'processing chains' that are efficient based on the data and working with the Container Orchestration/Virtual Machine Orchestration/Workload Distribution module or cloud platform to determine the best configuration for processing.
5.) Run techniques on data sets asynchronously if needed, to evaluate techniques.

For example, if lidar data is best processed by using Machine Learning, and then a neural network, this module experiments in an automated or human guided fashion to figure this out, keep track of the experimentation results as to the efficacy of this technique and either automatically use this technique or surface the results to allow for a human to understand and configure the system to use this data. Techniques for experimentation/use may be added via UI or through direct programming of the backend data storage and computation component. This module may use others such as the ML, or Neural network modules to determine results on data. The ETOM module may in fact collect, and compute the results of parallel experiments, or this may be done with a specialized module, the Container Orchestration/Virtual Machine Orchestration/Workload Distribution or in the Data storage and computation module.

Heuristics, Comparison Engine and, Image Processing

Heuristics here refers to computation that is not Machine Learning, Neural Network, Image processing and the comparison engine. In the heuristics process, general rules are used to process data. Examples of this might be something like eliminating whole sections of images that are known not to contain useful information (like the top half of an image when trying to locate a license plate that is on the bottom half). Heuristics can also be used on non-image data to perform logical operations, arithmetic operations and operations on data structures to determine if something like tire pressure is outside tolerance, if an error has occurred, or determine if any data points in combination with others is noteworthy. Heuristics may also include other computational methods outside of Machine Learning or Neural Network based processing. Image processing techniques are well documented and used to generate insights from image/video data. A comparison engine may be used to compare images from a vehicle or objects previous scans, or compare the condition of the vehicle/object with that of a reference object to determine differences (for example comparing a new car vs a used car to establish the used car's condition differential from new).

These modules are combined for illustrative purposes however can exist independently.

Machine Learning.

Machine Learning has a number of potential applications in the context of processing sensor data. Machine Learning may be used to gain insights from sensor data, or run predictive analytics on already stored data to derive insights. It is also possible for Machine Learning to pass data to any of the other modules if needed. Machine Learning is able to process vast amounts of data, of various different forms including but not limited to audio, video, and still images. The outputs of the machine learning may be used as an input into generating the condition report.

Neural Networks

Neural Networks are widely used for pattern recognition and are able to generalize and adapt to unexpected inputs and patterns and are designed with the intention of being able to to mimic human intelligence on a variety of tasks. Neural Networks are able to process vast amounts of data, of various different forms including but not limited to audio, video, and still images. The outputs of the neural networks can be used as an input into generating the condition report via processing of sensor data.

Data Storage and Computation

The data storage and computation module can come in a number of configurations, two examples being one in which data storage and computation exist together, another being where computation and data storage exist in a decoupled fashion. The current state of the art is that services like these are hosted in cloud services like Amazon Web Services and Google Compute Engine. However this process can be run locally or on a private cloud as well.

In one example configuration is a coupled configuration in which data storage and computation exist in the same layer. This can be thought about as a cloud based configuration, in which data storage and computation exist together and our modular processing is defined purely in software. Each element in this diagram is capable of bidirectional communication if needed.

The Data storage module may also be used to intake and process the results of parallel processing in previous steps, run mapreduce (or other state of art processing techniques) on data, keep statistics on specific objects, or groups of objects such as a fleet of cars or send this data to an external system. Indexing for search of data would normally be done here, but can be done in the previous modules as well.

Another use of this module is the storage of data related to the experimentation/technique optimization module (ETOM).

It is possible for All Computation (Neural Networks, Machine Learning, Heuristics, Image processing and comparison engine) to exist in the data storage and computation module if the technology platform being used allows for it.

Passback/Pass Forward pathway

This module is shown for illustrative purposes.

Pass Through to Inject Data

This module is shown for illustrative purposes.

Condition Assessment Report

While the module(s) here have been broken out for illustrative purposes, it is possible for them to all exist within a data storage and computation module provided by a cloud computing provider or a local machine(s).

The union of the sensor array data, and/or signal processing (local or from an external system) and/or the backend process create a Condition Assessment report which is configurable based on the needs of the consumer or external system it is being sent to (optionally raw data can be sent without backend processing if needed). This report can be human readable or in any machine readable format. The report can be used to classify a number of things including the value/authenticity of an object, the condition of an object, recommended ameliorative or preventative maintenance for an object, recommendations for the diagnoses of any issues, areas of low confidence of information such as blind spots or areas that have ambiguity, or simply areas of general interest that would need follow up. It is also possible for raw data to bypass this state and be sent to an external system directly, or raw data to constitute this report. Data at this stage can be sent back to objects that have the ability to communicate for the purposes of performing actions like the diagnostic criteria outlined herein. The Report may be autosaved, or saved at the discretion of the user. This report can be passed to and from any external system(s) such as one for automated or non-automated repair and maintenance. Data can be annotated/appended/altered on a(n) external system(s) and passed back into the system.

External System(s)

This module is optional and can refer to a diverse range of external systems

The External Systems may include anything from a remote viewing platform that allows an operator to manually view and/or annotate/approve data, to a labelling form to view and label data for training models, to an automated or non automated maintenance system. The data from this system can be exported for a multitude of purposes as read only or modifiable and potentially returned after being processed, appended, edited or viewed externally. In the case of labelled data or sensor data that was recorded by another external system or sensor array, this data can be sent through the local sensor array, backend process or simply stored for later use. Raw data can be sent directly to the external system if needed. Data may be sent to an external system to be stored as well. Indexing, storage and search may take place on an external system if needed.

User Interface

The User interface for the system preferably is modular and configurable based on the needs of customers/users. Different use cases will call for different sensor interactions/configurations, different presentation of results, and differing pass/fail criteria. For example, state inspections may only be concerned about items on an inspections checklist and ultimately grading a pass/fail, whereas vehicle inspections for the purpose of auto sales may want to arrive at the value of an object/vehicle in relation to its "blue-book" value as a function of the condition of itemized components. The UI may also allow for the use of search functionality.

Figure 13:
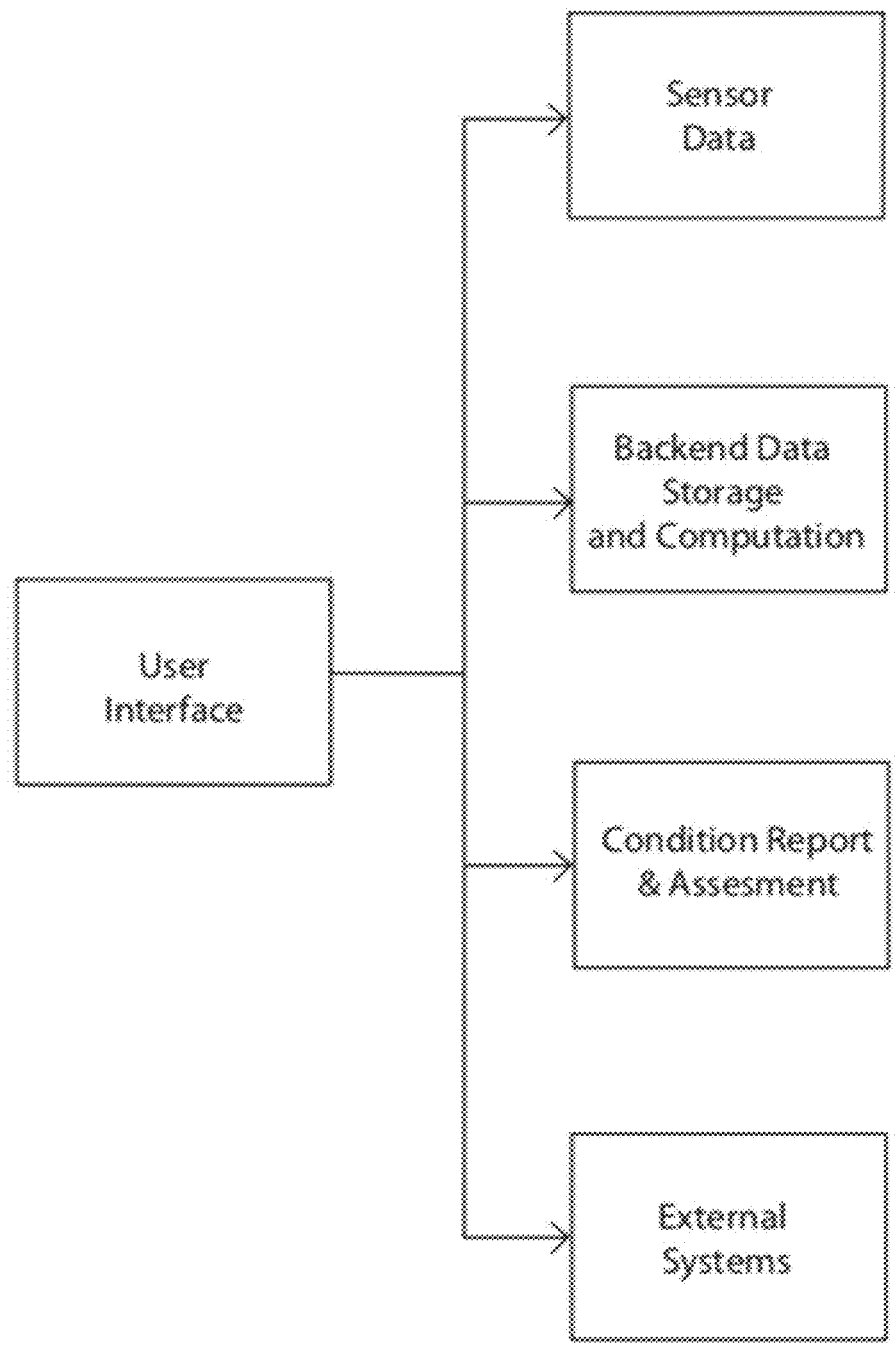
FIG. 13 illustrates the ability of the user interface to interact with aspects of the system/invention.

The user interface, may interact with any/all aspects of the sensor array, and/or any/all aspects of the Backend Data Storage and computation component, including an external system, as illustrated in FIG. 13. FIG. 13. illustrates the ability of the User Interface to interact with other aspects of the system.

Preferably, the user interface module can support the needs of multiple user types. As an example, an end user may have one type of User interface and an engineer or technician may have another.

Configuration of the sensor array, Backend Data Storage and Computation, and User interface itself may take place from here, or through programming the backend and sensor array directly.

Experimentation results can be displayed/interacted with here as well, and actions may be taken here to configure 'processing chains' manually or automatically.

Searching of data may be implemented here.

Queryability of data and the ability to take action on that data from the UI may be enabled here as well. For example a user may write a query in SQL or any other language and return a set of records, and perform manipulations directly on it from the interface—for example (export, open, trim, delete, copy to a location, view, reprocess, add to training set, annotate, send to external system, etc.)

The user interface preferably will allow for both local and remote management.

Data from this module may be passed to or from any other modules as needed.

This module may also allow for accessing of enterprise features such as viewing billing, usage statistics, or any information relevant to business needs.

This module may also be used to monitor system health or troubleshoot faults.

For example the interface may exist on any number of computation devices via Web, App, Native client.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Alternate embodiments are implemented in computer hardware, firmware, software, and/or combinations thereof. Implementations can be implemented in a computer program product tangibly embodied in a computer-readable storage device for execution by a programmable processor; and method steps can be performed by a programmable processor executing a program of instructions to perform functions by operating on input data and generating output. Embodiments can be implemented advantageously in one or more computer programs that are executable on a programmable computer system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits), FPGAs and other forms of hardware.

What is claimed is:

1. A system for assessing a condition of a vehicle, the system comprising:
    a configurable sensor array that scans the vehicle; and
    a backend component that determines a condition of the vehicle based on scan data from the sensor array, wherein the backend component uses at least one of neural networks, machine learning and heuristics to determine the condition of the vehicle based on the scan data;
    wherein the system also receives data from the vehicle, and the backend component determines the condition of the vehicle further based on the data received from the vehicle.

2. The system of claim 1 wherein the sensor array is stationary, and the sensor array scans the vehicle as the vehicle moves relative to the sensor array.

3. The system of claim 2 wherein at least some of the sensors in the sensor array are positioned above the vehicle, and the sensor array scans the vehicle as the vehicle moves underneath the sensor array.

4. The system of claim 1 wherein the sensor array is moveable, and the sensor array scans the vehicle as the sensor array moves relative to the stationary vehicle.

5. The system of claim 1 wherein the sensor array includes at least one of: a lidar, a radar, and an inertial measurement unit.

6. The system of claim 1 wherein the backend component determines at least one of: a visual condition of the vehicle, a mechanical condition of the vehicle, an operational condition of the vehicle, and a maintenance condition of the vehicle.

7. The system of claim 1 wherein the sensor array scans at least one of: an exterior of the vehicle, an interior of the vehicle, a mechanical system of the vehicle, and an electrical system of the vehicle.

8. The system of claim 1 wherein the data received from the vehicle comprises on-board diagnostics data from the vehicle.

9. The system of claim 1 wherein the system operates the vehicle or instructs a human to operate the vehicle, and the sensor array scans the vehicle during its operation.

10. A system for assessing a condition of a vehicle, the system comprising:
    a configurable sensor array that scans the vehicle; and
    a backend component that determines a condition of the vehicle based on scan data from the sensor array, wherein the backend component uses at least one of neural networks, machine learning and heuristics to determine the condition of the vehicle based on the scan data;
    wherein the backend component comprises cloud-based services.

11. The system of claim 10 wherein the sensory array has a fixed hardware configuration that cannot be changed after manufacture.

12. The system of claim 10 wherein the sensor array is an after-market kit suitable for installation in a residential setting.

13. The system of claim 10 further comprising:
a remote viewing platform that allows an operator to manually view and/or annotate/approve data relating to the condition of the vehicle.

14. A system for assessing a condition of a vehicle, the system comprising:
a configurable sensor array that scans the vehicle; and
a backend component that determines a condition of the vehicle based on scan data from the sensor array, wherein the backend component uses at least one of neural networks, machine learning and heuristics to determine the condition of the vehicle based on the scan data;
wherein the backend component comprises an experimentation/technique optimization module that experiments with different available techniques for processing the scan data and automatically selects from among the different available techniques based on the experiments.

15. The system of claim 14 wherein the experimentation/technique optimization module selects from among the different available techniques further based on human guidance.

16. A system for assessing a condition of a vehicle, the system comprising:
a configurable sensor array that scans the vehicle; and
a backend component that determines a condition of the vehicle based on scan data from the sensor array, wherein the backend component uses at least one of neural networks, machine learning and heuristics to determine the condition of the vehicle based on the scan data;
wherein the backend component automatically parallelizes processing of the scan data.

17. A system for assessing a condition of a vehicle, the system comprising:
a configurable sensor array that scans the vehicle; and
a backend component that determines a condition of the vehicle based on scan data from the sensor array, wherein the backend component uses at least one of neural networks, machine learning and heuristics to determine the condition of the vehicle based on the scan data;
wherein the sensory array is reconfigurable to collect different types of scan data to determine different types of conditions of the vehicle.

18. A system for assessing a condition of a vehicle, the system comprising:
a configurable sensor array that scans the vehicle; and
a backend component that determines a condition of the vehicle based on scan data from the sensor array, wherein the backend component uses at least one of neural networks, machine learning and heuristics to determine the condition of the vehicle based on the scan data;
wherein the backend component determines the condition of an autonomous driving capability of the vehicle.

19. A system for assessing a condition of a vehicle, the system comprising:
a configurable sensor array that scans the vehicle; and
a backend component that determines a condition of the vehicle based on scan data from the sensor array, wherein the backend component uses at least one of neural networks, machine learning and heuristics to determine the condition of the vehicle based on the scan data;
wherein at least one sensor in the sensor array is mounted on a drone.

* * * * *